United States Patent [19]
Klein

[11] 3,815,726
[45] June 11, 1974

[54] CONVEYOR
[75] Inventor: Edward I. Klein, Montreal, Quebec, Canada
[73] Assignee: V-Mark Automation Ltd., Montreal, Quebec, Canada
[22] Filed: Dec. 8, 1971
[21] Appl. No.: 206,097

Related U.S. Application Data
[63] Continuation of Ser. No. 25,792, April 6, 1970, abandoned.

[52] U.S. Cl. ............................................... 198/219
[51] Int. Cl. .............................................. B65g 25/04
[58] Field of Search ........................... 198/219, 107

[56] References Cited
UNITED STATES PATENTS
| | | | |
|---|---|---|---|
| 2,530,595 | 11/1950 | Blaha | 198/219 X |
| 2,622,401 | 12/1952 | Drago | 198/219 X |
| 3,193,088 | 7/1965 | White | 198/219 |
| 3,265,187 | 8/1966 | Hein et al. | 198/107 |
| 3,451,532 | 6/1969 | Manterfield | 198/219 |

FOREIGN PATENTS OR APPLICATIONS
| | | | |
|---|---|---|---|
| 1,180,342 | 6/1959 | France | 198/219 |

Primary Examiner—Richard E. Aegerter
Assistant Examiner—Hadd S. Lane
Attorney, Agent, or Firm—Alan Swabey & Co.

[57] ABSTRACT

An article conveyor comprising a first pair of plates mounted for cyclic movement with respect to a second pair of fixed plates so as to move an article stepwise along the second pair of plates. Means are provided, operated by the cyclic movement of the first pair of plates, for stopping the first pair of plates in various positions in their path of movement.

6 Claims, 6 Drawing Figures

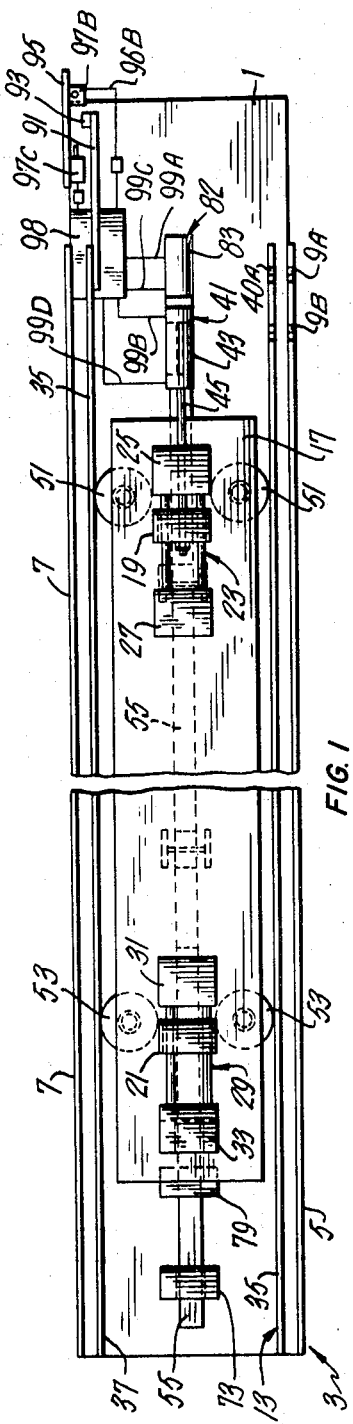
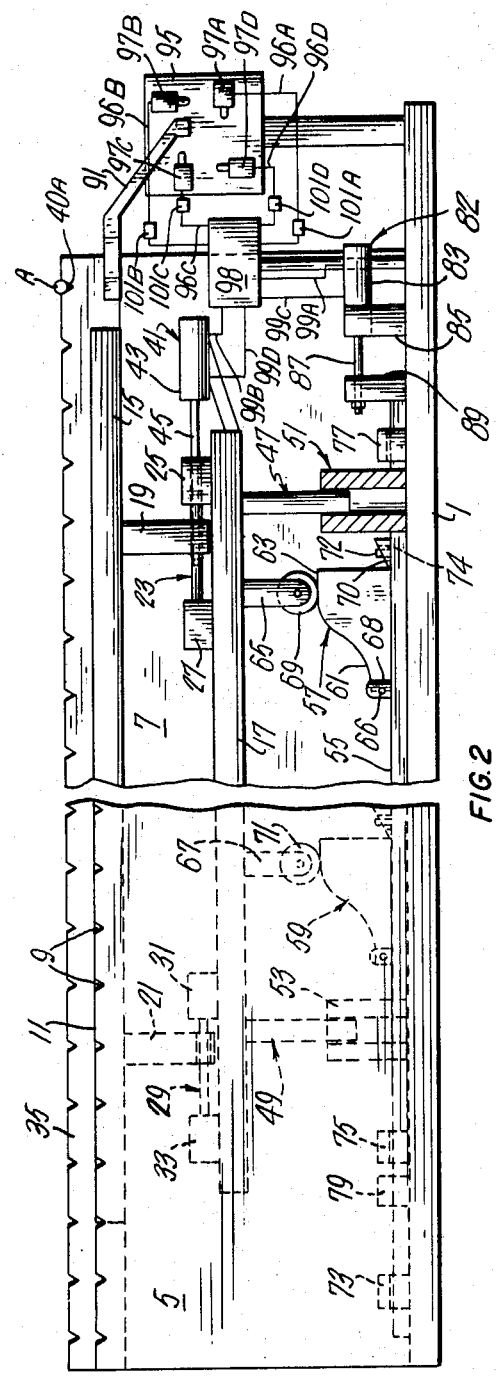
FIG.1
FIG.2
INVENTOR
Edward I. KLEIN
ATTORNEY

INVENTOR
Edward I. KLEIN

*Alan Swabey*
ATTORNEY

*INVENTOR*
Edward I. KLEIN

*ATTORNEY*

CONVEYOR

This is a continuation of application Ser. No. 25,792 filed Apr. 6, 1970.

BACKGROUND OF INVENTION

1. Field of Invention

This invention relates to an improved article conveying apparatus.

More particularly, the invention relates to an improved article conveying apparatus for positively moving articles from one point to another in a series of steps with means for controlling operation of the conveyor during each step, if desired.

The conveyor is particularly suited for use in an assembly machine where one component of an article to be assembled is carried by the conveyor past a series of work stations. Other components of the article are assembled to the one component at the various work stations.

2. Description of Prior Art

Intermittent or step conveyors, such as a "walking-beam" conveyor are known. Such conveyors comprise essentially two longitudinal members with one mounted for movement relative to the other. Both members have spaced means for supporting an article at different locations along the length of the members. One member is moved eccentrically relative to the other member so as to move an article from one location on the fixed member to the following location. The conveyors conventionally employ eccentric drives for moving the one member relative to the other in a circular path.

Conveyors of this type have disadvantages. The eccentric drive means are relatively slow and cumbersome. It is difficult to change the path of movement followed by the movable member. It is also difficult to accurately stop the movable member at different positions in its path of travel because of override of the eccentric drive.

SUMMARY OF INVENTION

The present invention is directed toward an improved walking-beam type conveyor which overcomes many of the disadvantages of known walking-beam conveyors. The improved conveyor has a high operational speed, the path followed by the movable member can be easily varied, the movable member can be accurately stopped in various positions, and the conveyor is simple and compact in construction.

The invention is particularly directed toward an article conveyor of the type having first article supporting means and second article supporting means. The first article supporting means is fixed to a base. The second article supporting means is mounted on a first member. The first member is mounted for movement in opposed directions in a first plane on a second member. The second member is mounted on the base for movement in opposed directions in a second plane. First means are provided for moving said first member relative to said second member in said first plane. Second means are provided for moving said second member relative to said base in said second plane, whereby said first member follows a predetermined path of movement with respect to the base. Control means are mounted on the base, for controlling operation of the first and second means. Means are carried by the first member for selectively actuating the control means during the path of movement of the first member.

BRIEF DESCRIPTION OF DRAWINGS

The invention will be described in detail having reference to the accompanying drawings, wherein:

FIG. 1 is a plan view shown in partial cross-section of the conveying apparatus;

FIG. 2 is a front elevation view taken in partial cross-section of the conveying apparatus;

DESCRIPTION OF THE PREFERRED EMBODIMENTS

Figure 3:
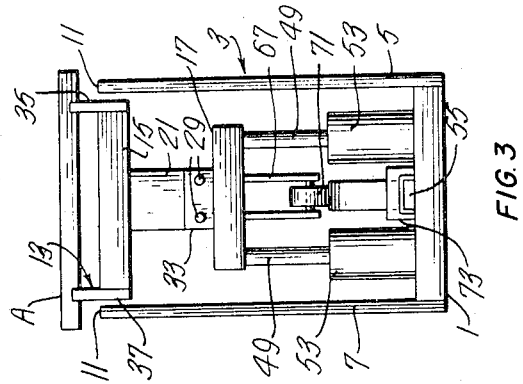
FIG. 3 is a cross-sectional view taken along line 2—2 of FIG. 1.

As shown in the drawings, the walking-beam conveyor means has a base member 1. Mounted on the base member is a first article supporting means 3. This supporting means is connected to the base member, and in the preferred form, comprises first and second spaced apart plates 5 and 7. A series of equally spaced V-shaped notches 9 are formed in the upper edge 11 of each of the plates. The edges 11 of the plates 5 and 7 are level with each notch in one plate 5 aligned with a notch in the other plate 7. These notches form retaining means for articles to be conveyed. The article "A" to be conveyed extends across the plates resting in one of a pair of the aligned notches. Other article retaining means, such as grooves or pins, could also be used in place of the "V" notches, as well as other notch shapes.

A second article supporting means 13 is provided which is movable relative to the first means 3. The second means comprise plates 35, 37 mounted on a sliding plate 15 which in turn is mounted on a support 17. The plate 15 is guided for sliding movement on the support 17 by first and second guide members 19 and 21 attached to the bottom of sliding plate 15. The guide member 19 at one end of plate 15 has a pair of apertures permitting it to ride on a first pair of guide rods 23 which are supported at one end in a first guide block 25 and at the other end in a second guide block 27, both guide blocks connected to the support 17 at one end thereof. The opposite end of the plate 15 is guided for movement relative to the support 17 by a second pair of guide rods 29 which are connected at opposite ends to third and fourth guide blocks 31, 33 attached to the support. The second guide member 21, at the opposite end of the plate 15, has apertures receiving the second pair of guide rods 29.

Plates 35, 37 are attached to the sides of the sliding plate 15. Article retaining means are formed in the upper edge 39 of the plates. The article retaining means can comprise notches 40 which have an identical configuration to the notches 9 in the plates 5 and 7 of the first guide means. The plates 35, 37 are located between the plates 5, 7 with plate 35 closely adjacent to plate 5 and plate 37 closely adjacent to plate 7.

Both plates 35, 37 and plates 5, 7 can be easily replaced with other plates having different types of article retaining means or different spacing between the article retaining means depending on the type of motion required and the amount of travel required to be imparted to the articles.

First means 41 are provided for moving the sliding plate 15 and the plates 35, 37 on support 17 in opposed directions in a first plane. These means can comprise a hydraulic or pneumatic cylinder 43 having a piston rod 45 extending therefrom, as shown in FIG. 2. The cylinder 43 is mounted on one end of the support 17 and the piston rod 45 of the cylinder is connected to first guide member 19 attached to the bottom of the sliding plate 15. The rod 45 passes freely through an aperture in first guide block 25.

Operation of cylinder 43 causes movement of the sliding plate 15 relative to support 17 in opposed directions in a first plane, while riding on the first and second pair of guide rods 23, 29.

The support 17 is itself mounted on the base 1 of the apparatus for movement in opposed directions in a second plane. Preferably, the second plane is perpendicular to the first plane, in which first plane the plate 15 moves in opposed directions. A first and second pair of guide pins 47, 49 are attached to the ends of the support 17, the guide pins extending down so each pair rests in a respective pair of sockets 51, 53 connected to the base of the apparatus. A cam plate 55 is mounted on the base 1 for sliding movement with respect thereto in opposed directions in the first plane. The cam plate 55 carries a pair of identical cams 57, 59, each of which has a low portion 61 and a high portion 63. Mounted on the support 17 by brackets 65, 67, are rollers 69, 71. The rollers 69, 71 ride on the cams 57, 59 respectively.

The cam plate 55 is guided for movement on the base 1 by apertured guide blocks 73, 75, 77 attached to the base. The guide blocks 73, 75, 77 have apertures of slightly larger cross-section than the cross-section of the cam plate 55. A stop block 79 is attached at one end of the cam plate for limiting movement of the cam plate 55 between two of the fixed guide blocks 73, 75. Second means 82 are provided for moving the cam plate 55 back and forth on the base 1 in the first plane. The means 82 can comprise a second pneumatic or hydraulic cylinder 83, attached to one end of the base 1, by a bracket 85. A piston rod 87 extends from the cylinder 83 and is connected by a bracket 89 to one end of the cam plate 55. Movement of the piston rod 87 by the cylinder 83 causes the cam plate to move back and forth. Movement of the cam plate in turn causes movement of the cams 57, 59 carried by the cam plate. This in turn causes the support 17 to move vertically up and down in the second plane, guided by the vertical guide pin pairs 47, 49, through the cams moving under the rollers 69, 71.

If desired, the cams 57, 59 can be mounted so as to be adjustable in height thus permitting variation in the vertical distance travelled by the plates 35, 37. For example, the cams 57, 59 can be pivotably connected to cam plate 55 adjacent the end of the low portion 61 by a pin 66 and bracket 68 connection. A tapered block or wedge 70 is slidably connected to cam plate 55 adjacent the opposite end of each cam. The wedge 70 has a slot extending in the direction of the cam plate 55. A locking bolt 72 passes through the slot 74 connecting the wedge 70 to the cam plate 55. When the bolt 72 is loosened, the wedge 70 can be moved toward or away from cam 57, 59 thus raising or lowering the cams about their pivot connection to the cam plate, and increasing or decreasing the vertical distance moved by plates 35, 37.

In operation of the apparatus, articles A to be conveyed are fed to one end of the plates 5, 7 to rest in the first notch 9A of each of the plates 5, 7. At this time, the cam plate 55 is positioned so the rollers 69, 71 are resting on the lower portion 61 of the cams 57, 59 so that the upper edges 39 of the plates 35, 37 are below the upper edges 11 of the plates 5, 7. The second cylinder 83 is then operated to push the cam plate in one direction whereby the cams 57, 59 are moved to position their high portion 63 under the rollers 69, 71. This elevates support 17 and thus the plates 35, 37 so their upper edges 39 are now above the upper edges 11 of the plates 5, 7. During this movement, the first notch 40A in each of plates 35, 37, which are aligned with first notches 9A in plates 5, 7, pick up and lift the article above the upper edges 11 of the plates 5, 7.

The first cylinder 43 is then operated to push the plate 15 forward along support 17 thus moving the plates 35, 37 and the article, forward relative to the plates 5, 7. The second cylinder 83 is then again operated in its reverse direction moving cam plate 55 in a reverse direction, thus lowering support 17 and plates 35, 37. During this movement, the notches 40A in plates 35, 37, which are now aligned with the second notches 9B in plates 5, 7 are lowered below the upper edges 11 of the plates 5, 7, thus depositing the article in the second notches 9B of the plates 5, 7. The first cylinder 43 is then operated in the reverse direction to cause the plate 15 to move back along support 17 to its first position where the notches 40A are again aligned with the first notches 9A in the plates 5, 7. This completes one cycle of operation of the apparatus. The cycle of operation is then repeated moving articles along succeeding notches in the plates 5, 7 from one end of the plates to the other. The path of movement of the second guide means relative to the first guide means is quadrilateral.

Means are provided to control the sequential operation of the first and second cylinders 43, 83 so as to move the articles automatically once the apparatus has been started. These means can comprise an arm 91 connected to one of the plates 35, 37. The arm 91, shown in FIG. 1, is connected to one end of plate 37 and has a finger 93 extending transversely therefrom at the other end. A mounting plate 95 is connected to the base 1 to extend vertically, adjacent the finger 93. Mounted on the plate 95 in operative relationship to the finger 93 during its movement are four sensors 97A, 97B, 97C and 97D. The sensors 97 electrically control a device 98 through lines 96A, 96B, 96C and 96D for alternatively feeding air or fluid to one end or the other of the hydraulic or pneumatic cylinders 43, 83 through lines 99A, 99B, 99C and 99D. Thus, the first sensor 97A controls cylinder 83 through lines 96A, 99A, to raise plates 35, 37 relative to plates 5, 7 by moving cam plate 55 forward. As the plates 35, 37 near the end of their upward movement, finger 93, carried by the plate 37, contacts the second sensor 97B thus actuating cylinder 43 through lines 96B, 99B and device 98 in one direction to slide plate 15 to the left as viewed in FIG. 1. This moves plates 35, 37 along with finger 93. At the end of this movement, the finger 93 contacts the third sensor 97C thus causing operation of the second cylinder 83 through lines 96C, 99C in the reverse direction to lower the plates 35, 37 and thus finger 93 so it then contacts the fourth sensor 97D which causes operation of the first cylinder 43 through lines 96D, 99D in a reverse direction to withdraw the plate 15 to the right as viewed in FIG. 1 and move the plates 35, 37 with it. The cycle of operation is automatically repeated.

The sensors 97 can be adjustably located in various positions on the mounting plate 95 so as to control the form of the path of movement imparted to the plates 35, 37 relative to the plates 5, 7. For example, the sensors can be located so as to begin a movement of the second supporting means in a second direction before its movement in a first direction has been completed in order to change the sharply rectilinear path followed by the second supporting means to a substantially rectilinear path.

If desired, each of the lines 96 connecting the sensors 97 to the control device 98 could contain an off-on switch 101A, 101B, 101C and 101D. During normal operation, each switch 101 is on. If it is desired to stop the plates 35, 37 at the end of their travel in any of the four directions, the appropriate switch 101 is manually turned off. When the corresponding sensor is contacted by the finger 93, the related cylinder is not actuated by device 98 and the apparatus is stopped.

Figure 4:
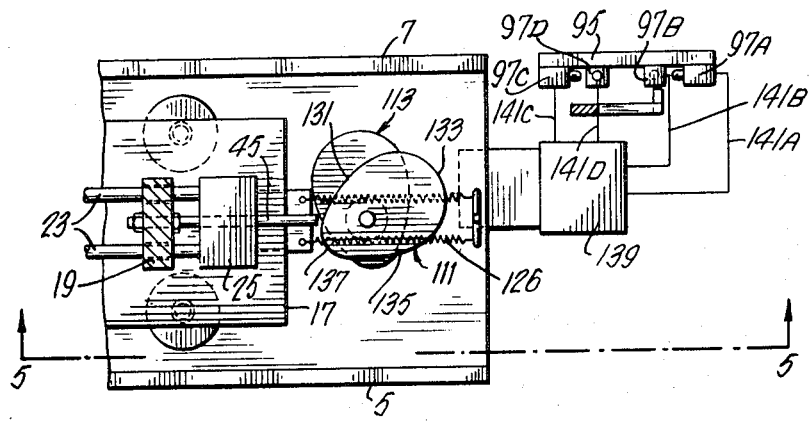
FIG. 4 is a partial cross-section view of an alternative drive means for the conveyor, taken along line 4—4 of FIG. 5.
Figure 5:
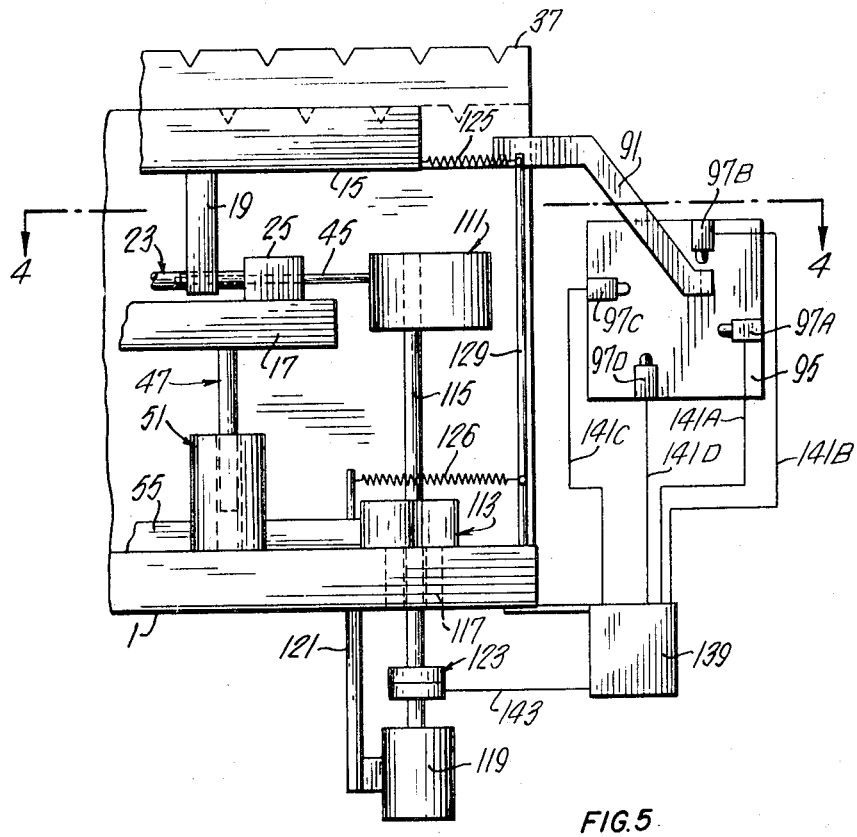
FIG. 5 is a partial cross-sectional view of the alternative drive means shown in FIG. 4, taken along line 5—5.

While one form of first and second means 41, 82 for moving the second supporting means has been shown in the form of pneumatic or hydraulic cylinders, other suitable moving means can also be used. As shown in FIGS. 4 and 5, the cylinders 43, 83 are replaced by a pair of cams 111, 113. The cams are fixed to a vertical shaft 115, mounted by a bearing 117 in the base 1 and driven by a motor 119 connected to the base by a bracket 121. A magnetic clutch and brake mechanism 123 connects the shaft 115 to the motor 119. One of the cams, 111, is mounted adjacent the end of support 17 to contact rod 45. The second cam 113 is mounted adjacent the end of cam plate 55. Both the sliding plate 15 and cam plate 55 may be spring biased against the cams 111, 113 by springs 125, 126 attached to a rod 129 fixed to the base 1.

The cams 111, 113 can be shaped to provide various paths of movement to the plates 35, 37 relative to plates 5, 7 during their rotation. A rectilinear movement can be provided, similar to that provided by cylinders 43, 83, by shaping each cam edge to have, in sequence, a rise portion 131, a dwell portion 133, a fall portion 135, and a dwell portion 137. The cams 111, 113 are fixedly mounted on the shaft 115 with their rise portions 131 angularly offset with respect to each other so that when rotated by motor 119, the rise portion 131 on cam 111 moves rod 45 to the left as seen in FIG. 4 against spring 125, dwell portion 133 on cam 113 maintaining cam plate 55 in a fixed position. When rod 45 has been moved to the left as shown in FIG. 4, by the rise portion 131 of cam 111, it is maintained there by following dwell portion 133 while fall portion 135 of cam 113 permits cam plate 55 to move right as shown in FIG. 4 by action of spring 126, thus lowering support 17. Cam 111 is of sufficient height to accommodate rod 45 when support 17 is in its raised or lowered position.

Other cam shapes can be used to provide paths of movement to the plates 35, 37 which are other than substantially rectilinear, if desired. The cams 111, 113 can be constructed to be removed together as a subassembly unit from shaft 115 by connecting them together with a collar (not shown) which rides on shaft 115 and is keyed thereto. This simplifies the replacement of the cams 111, 113 as a unit by cam units having cams of different shapes.

The cams 111, 113 are used in combination with the sensors 97A, 97B, etc., operated by the finger 91 carried by one of the plates 35, 37, to control stopping of the plates 35, 37 in one of several positions during their path of movement in the same manner as when using cylinders 43, 83. The sensors 97A, 97B, etc. are adjustably mounted on plate 95 to cooperate with the path of movement followed by finger 91 depending on the shape of the cams used. The sensors are connected to a control device 139 by lines 141A, 141B, etc. The control device 139 operates the magnetic brake and clutch assembly 123 through line 143 to stop rotation of shaft 115 and thus cams 111, 113 at different angular positions. Switches 145A, 145B, etc. are located in each of the lines leading from the sensors to the control device and are normally closed. Manual operation to open any one switch will stop the plates 35, 37 in a preselected position in their path of movement. In this embodiment, using cams, the number of sensors 97 used can be varied depending on the number of positions the plates 35, 37 are to be stopped in during their path of movement.

Figure 6:
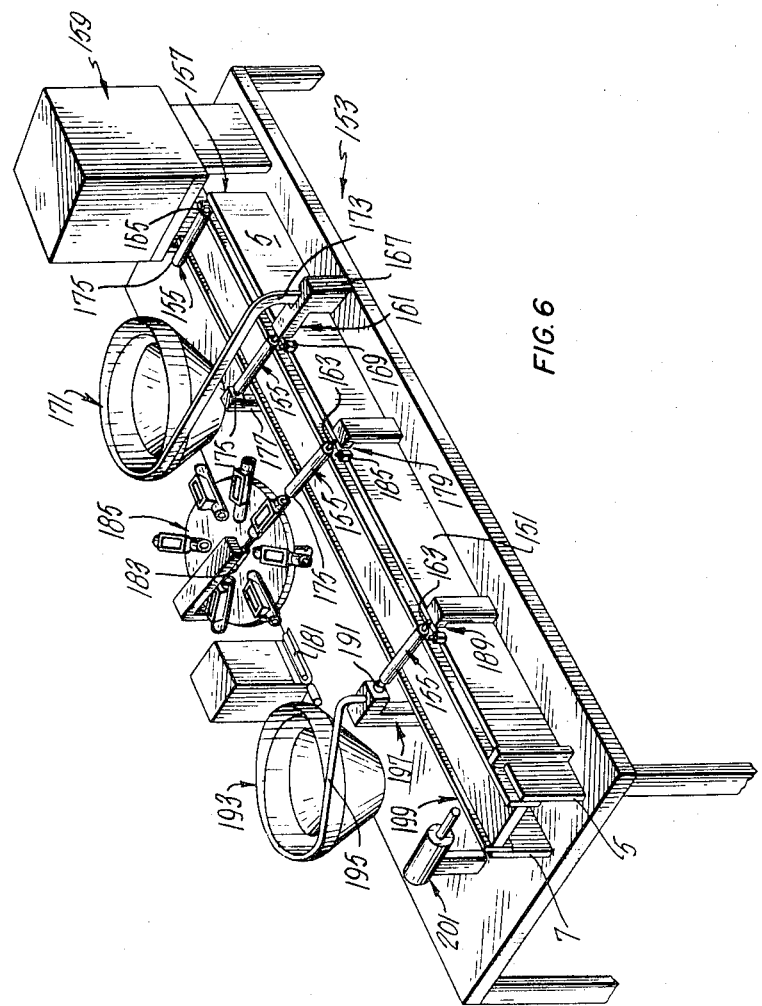
FIG. 6 is a schematic view showing the conveyor forming part of a pen assembly machine.

The conveyor described can be advantageously used in pen assembly machines for conveying pen components past a series of work stations. As shown in FIG. 6, the conveyor 151 forms part of a pen assembly machine 153 to convey a series of pen casings 155 past a series of stations for assembling other pen components with the casing.

The receiving end 157 of the conveyor is positioned beneath a pen casing supply source 159 from which casings 155 are fed into the first notch of plates 5, 7 of the conveyor, one at a time. The conveyor feeds the casings stepwise from one notch in plates 5, 7 to each succeeding notch, to a first work station 161 at which a nib 163 may be applied to one end 165 of the casing by a nib applying mechanism 167. The nib 163 is applied when the casing 155 at this station is supported in the notches of the fixed plates 5, 7, while the movable plates 35, 37 are moving below the fixed plates and back to the preceding notch.

The nib applying mechanism 167 can be actuated by a sensor 169 which senses seating of a casing at the notches of plates 5, 7 at this station. The nib applying mechanism receives nibs from nib supply source, such as a vibratory feeder 171, via a track 173. The nib applying mechanism operates, in a known manner, to insert a nib into the open end of the pen casing, while the opposite end 175 of the casing is held by a stop 177.

The casing, with the inserted nib, is then moved stepwise along each succeeding notch in plates 5, 7 by the conveyor to a second work station 179. Here, an inked filler 181 may be inserted into the casing from its opposite open end 175, again while the casing is supported in notches in the fixed plates 5, 7 at this station, during return movement of plates 35, 37. The filler 181 is inserted by a pusher mechanism 183, actuated by a sensor 185 which senses arrival of the casing in the notches at this station. The inked filler 181 may be inserted from an indexing and ink applying table 187. The casing, now with the inserted nib and inserted inked filler is conveyed stepwise to a further work station 189 where a closure cap 191 is applied to the casing to close the open opposite end to maintain the filler in the casing. The cap 191 is fed from another known vibratory feeder 193 down a track 195 to a known cap applying mechanism 197 which pushes the cap onto the casing after sensing that the casing is positioned in the notches. This completes assembly of the pen.

If desired, the assembled pen can be conveyed stepwise to a welding station 199 where the cap is welded to the casing welding means 201 while the casing is supported in the notches of plates 5, 7 at this station.

The conveyor is particularly suited for use in assembly machines.

Since the motion of the plates can be controlled, the casings can be moved positively into position at each work station and supported in position at each station for a sufficient period of time to carry out an operation at the station. The conveyor can be stopped at any one of several positions in the path of movement of plates 35, 37 if jamming occurs at any work station. If desired, for example, the sensors 169, 185 at the work stations, used to detect arrival of a casing, can be connected to the switches 101 or 145 in the control mechanisms depending on the type of drive means used. The sensors 169, 185 would automatically stop the movement of the conveyor by opening one of the switches if a casing is not detected. These sensors could be located at other positions along the length of the conveyor, other than at the work stations, for sensing casings and could stop the plates 35, 37 in one of several positions depending on which switch 101 or 145 is actuated.

While the conveyor has been shown as forming part of a pen assembly machine, it can be used in other types of high speed assembly machines as well.

I claim:

1. Article conveying means comprising:
    first, fixed, article supporting means;
    first support means;
    second article supporting means fixedly mounted on said first support means;
    second support means;
    first mounting means for mounting said first support means, and said second article supporting means mounted thereon, on said second support means for reciprocating movement in a first direction relative to said first article supporting means;
    third support means;
    second mounting means for mounting said second support means, and said first support means and second article supporting means mounted thereon, on said third support means for reciprocating movement in a second direction, perpendicular to the first direction, relative to said first article supporting means;
    first moving means for reciprocating said first support means in said first direction;
    second moving means for reciprocating said second support means in said second direction perpendicular to said first direction;
    and control means for operating said first and second moving means in a predetermined sequence to repetitively move said second article supporting means through a closed path of travel relative to said first article supporting means;
    wherein said second moving means includes cam means mounted on said third support means, said cam means cooperating with said second support means, and actuating means for reciprocating said cam means in said first direction to move said second support means in said second direction;
    and wherein the first moving means and the actuating means comprise first and second cam members, the cam members fixed to a rotatable shaft supported by the third support means, a motor drivingly connected to the shaft by a brake and clutch mechanism, the control means connected to the brake and clutch mechanism to stop the rotation of the shaft by the motor at different angular positions.

2. Article conveying means as claimed in claim 1, wherein said control means includes adjustable sensors mounted in the path of movement of an actuating member carried by the second article supporting means to initiate operation of said first and second moving means.

3. Article conveying means as claimed in claim 2, wherein the first moving means and the actuating means comprise two hydraulic or pneumatic cylinders, the first cylinder mounted on the first support means and the second cylinder mounted on the third support means.

4. Article conveying means as claimed in claim 2, wherein the control means includes a manually operated on-off switch associated with each sensor to permit the second carrying means to be stopped at selected positions in its path of movement.

5. Article conveying means as claimed in claim 1, wherein the first article supporting means has a first surface with equally spaced apart article receiving means and the second article supporting means has a second surface with equally spaced apart article receiving means, the spacing of the article receiving means on the second surface being substantially the same as the spacing of the article receiving means on the first surface, said first moving means moving the second article supporting means in the first direction to have each of the article receiving means on the second surface move back and forth between two adjacent article receiving means on the first surface, and said second moving means moving said second article supporting means in the second direction to have the second surface move above and below said first surface.

6. Article conveying means as claimed in claim 1, wherein said first and second article supporting means each comprise a pair of spaced apart vertical plate members, one pair of spaced apart plate members located between the other pair of spaced apart plate members and equally spaced apart article retaining means on the upper free edges of both pairs of plate members.

* * * * *